(12) United States Patent
Haefner et al.

(10) Patent No.: US 10,300,765 B2
(45) Date of Patent: May 28, 2019

(54) HEAT EXCHANGER ARRANGEMENT, ESPECIALLY FOR A FUEL-OPERATED VEHICLE HEATER

(71) Applicant: Eberspächer Climate Control Systems GmbH & Co. KG, Esslingen (DE)

(72) Inventors: Michael Haefner, Stuttgart (DE); Andreas Alber, Stuttgart (DE); Thomas Bauer, Dettingen (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 833 days.

(21) Appl. No.: 14/859,746

(22) Filed: Sep. 21, 2015

(65) Prior Publication Data

US 2016/0082811 A1  Mar. 24, 2016

(30) Foreign Application Priority Data

Sep. 22, 2014  (DE) .......................... 10 2014 219 044

(51) Int. Cl.
| | |
|---|---|
| *F28D 7/10* | (2006.01) |
| *B60H 1/22* | (2006.01) |
| *F24H 1/00* | (2006.01) |
| *F24H 1/26* | (2006.01) |
| *F24H 8/00* | (2006.01) |

(52) U.S. Cl.
CPC ......... *B60H 1/2212* (2013.01); *B60H 1/2209* (2013.01); *F24H 1/009* (2013.01); *F24H 1/263* (2013.01); *F24H 8/00* (2013.01); *B60H 1/22* (2013.01); *B60H 2001/2271* (2013.01); *F23N 2041/14* (2013.01); *Y02B 30/102* (2013.01)

(58) Field of Classification Search
CPC .......... F24H 8/006; F24H 1/009; F24H 1/263; B60H 1/2212; B60H 1/22; B60H 1/2209
USPC .......................................................... 165/154
See application file for complete search history.

(56) References Cited

U.S. PATENT DOCUMENTS 3,989,029 A * 11/1976 Friedl ...................... B60H 1/22
                                                            126/110 B
4,923,033 A *  5/1990 Panick ................ B60H 1/2212
                                                            126/116 R
(Continued)

FOREIGN PATENT DOCUMENTS

| DE | 11 68 933 B | 4/1964 |
|---|---|---|
| DE | 12 91 496 B | 3/1969 |

(Continued)

OTHER PUBLICATIONS

European Search Report dated Feb. 8, 2016.

*Primary Examiner* — Paul Alvare
(74) *Attorney, Agent, or Firm* — McGlew and Tuttle, P.C.

(57) ABSTRACT

A heat exchanger arrangement (10), especially for a fuel-operated vehicle heater, includes an outer pot-shaped housing (12) having an outer bottom wall (16) and an outer circumferential wall (18) extending along a longitudinal axis (L). An inner pot shaped housing (14) has an inner bottom wall (20) and an inner circumferential wall (22) extending along the longitudinal axis (L). A flow space (24) for fluid whose temperature is to be regulated is formed between the inner housing (16) and the outer housing (12). At least one liquid uptake volume (46, 48) for taking up liquid condensed in the inner housing (14).

16 Claims, 3 Drawing Sheets

(56) References Cited

U.S. PATENT DOCUMENTS

| | | | | |
|---|---|---|---|---|
| 6,089,465 A | * | 7/2000 | Habijanec | B60H 1/2209 237/12.3 B |
| 2012/0180452 A1 | * | 7/2012 | Caine | B60H 1/025 60/273 |
| 2013/0025702 A1 | | 1/2013 | Lee et al. | |
| 2016/0023535 A1 | * | 1/2016 | Alber | F24H 9/148 60/320 |

FOREIGN PATENT DOCUMENTS

| | | |
|---|---|---|
| DE | 35 46 368 A1 | 7/1987 |
| DE | 42 11 153 A1 | 10/1993 |
| DE | 198 45 583 A1 | 4/2000 |
| DE | 10 2004 008358 A1 | 9/2005 |
| DE | 10 2008 043 821 A1 | 6/2009 |
| WO | 2008/129076 A1 | 10/2008 |
| WO | 2012/156954 A1 | 11/2012 |

* cited by examiner

HEAT EXCHANGER ARRANGEMENT, ESPECIALLY FOR A FUEL-OPERATED VEHICLE HEATER

CROSS REFERENCE TO RELATED APPLICATIONS

This application claims the benefit of priority under 35 U.S.C. § 119 of German Patent Application 10 2014 219 044.4 filed Sep. 22, 2014, the entire contents of which are incorporated herein by reference.

FIELD OF THE INVENTION

The present invention pertains to a heat exchanger arrangement, especially for a fuel-operated vehicle heater, comprising an inner pot-like (pot-shaped) housing and an outer pot-like housing, between which a flow space for a fluid whose temperature is to be regulated is defined.

BACKGROUND OF THE INVENTION

Such heat exchanger arrangements are used to transfer thermal energy generated in a combustion chamber by the combustion of a fuel/air mixture to a fluid used as a heat transfer medium. To monitor the operation of the vehicle heater, a flame sensor is, in general, provided, which may be arranged in the area of a waste gas discharge opening on the heat exchanger arrangement. Such a flame sensor may be designed, for example, as a photodiode or as a conductivity sensor and is set up to record a flame-out. If a flame-out is recorded, reignition of the fuel/air mixture present in the combustion chamber is, in general, initiated.

When the vehicle heater is started in a cold state, it may happen that substances being transported in the waste gases in the form of vapor, such as, e.g., water, are condensed in the heat exchanger arrangement and collect in the vicinity of the flame sensor, as a result of which the risk arises that the condensation water collected will be whirled up by waste gases flowing past later and will come into contact with the flame sensor. This contact may affect the operating characteristics of the flame sensor in such a way that it sends a flame-out signal to a control device, whereupon the latter initiates, as was explained above, a restart of the vehicle heater, which leads to an at least short-term interruption of the heating operation.

SUMMARY OF THE INVENTION

An object of the present invention is to provide a heat exchanger arrangement, especially for a fuel-operated vehicle heater, with which the probability of an interruption of operation because of condensed liquid collected in the heat exchanger arrangement can be minimized.

This object is accomplished according to the present invention with a heat exchanger arrangement, especially for a fuel-operated vehicle heater, comprising:
  an outer pot shaped housing having an outer bottom wall and an outer circumferential wall extending along a longitudinal axis,
  an inner pot shaped housing having an inner bottom wall and an inner circumferential wall extending along the longitudinal axis, wherein a flow space is formed for fluid whose temperature is to be regulated between the inner housing and the outer housing, and
  at least one liquid uptake area for taking up liquid condensed in the inner housing.

By providing a liquid uptake area (or liquid uptake volume) according to the present invention for taking up liquid condensed in the inner housing, it is possible to collect especially liquid condensed at the beginning of the operation in an area in which the probability of whirling up by waste gases flowing past is minimized. A compromise of the operating characteristics of a flame sensor by whirled-up condensed liquid can be prevented hereby, so that a restart of the vehicle heater is carried out only when a flame-out is, indeed, present.

To make it possible to provide an overall compact design of the heat exchanger arrangement, provisions may, furthermore, be made for at least one liquid uptake area to be formed at the inner housing. Even though it is also conceivable, in principle, to provide the liquid uptake area by an additional element to be provided at the inner or outer housing, the necessity of such an additional element is eliminated by a liquid uptake area being formed at the inner housing.

Provisions may be made in a variant of the present invention for at least one liquid uptake area being in connection with an inner space enclosed by the inner housing via an opening on the inner housing.

It is possible as a result to release the condensed liquid collected in the particular liquid uptake area into the flow area of the waste gas flowing out by evaporation when a sufficiently high temperature is reached, as a result of which it can again leave the heat exchanger arrangement with the waste gas. Therefore, no additional draining means are necessary at a corresponding liquid uptake area in order to drain off the condensed liquid collected therein.

Provisions may, furthermore, be made in this connection for the opening to have a smaller extension than the liquid uptake area in the circumferential direction or/and in the direction of the longitudinal axis. A small potential interaction surface is consequently created hereby between the waste gases flowing off and the condensed liquid collected in a liquid uptake area relative to the extension of a liquid uptake area, as a result of which the probability of the condensed liquid collected therein being whirled up by waste gases flowing off and coming into contact with the flame sensor can be minimized.

To make it possible to collect deposited condensed liquid very rapidly at least at the beginning of the operation of the vehicle heater and thus to avoid whirling up by waste gases following off, provisions may be made in a variant of the present invention for assigning at least one liquid guide channel, preferably provided by a step-like shoulder, for guiding condensed liquid towards the liquid uptake area. Such a liquid guide channel may have, for example, a groove-like design and be arranged in the operating position of the heat exchanger arrangement such that the deposited condensed liquid can flow off to the liquid uptake area by gravity.

Since a flame sensor is typically arranged in the area of a waste gas discharge opening of the heat exchanger arrangement, it is advantageous if at least one liquid uptake area is provided in the area of a waste gas discharge opening. A short flow path with correspondingly low flow losses to a corresponding liquid uptake area can be ensured hereby, so that a large part of the condensed liquid can be collected in this.

The gas discharge opening is preferably provided according to an embodiment in an end area of the inner housing located at a distance from the inner bottom wall in the direction of the longitudinal axis. The waste gas flowing in from the combustion chamber is typically introduced in a heat exchanger arrangement defined above into the heat exchanger arrangement in the area of the inner bottom wall. The waste gases flowing in are deflected at the inner bottom wall and then flow into the end area of the inner housing located a distance from the inner bottom wall essentially in the direction of the longitudinal axis along a large part of the inner circumferential wall. On the one hand, an efficient energy transfer can be achieved hereby from the waste gases flowing in to the inner housing, and, on the other hand, it is possible to contribute with such a design to a part of the substances being transported in the waste gases in the form of vapor, such as water, being condensed already on the way to the waste gas discharge opening at the inner bottom wall and the inner circumferential wall, as a result of which it can be ensured that little liquid will deposit by condensation in the area of the waste gas discharge opening.

To make it possible to collect liquid especially efficiently with such a design in the area of the waste gas discharge opening, provisions may be made in a variant of the present invention for at least one liquid guide channel leading from the waste gas discharge opening to a liquid uptake area.

To make it possible to adapt the installed position of a vehicle heater individually to the particular structural conditions depending on the type of the vehicle and to make it nevertheless possible to ensure that condensed liquid can be reliably collected in the heat exchanger arrangement independently from the installed position, provisions may, furthermore, be made for a plurality of liquid uptake areas following one another in the circumferential direction to be provided. As a result, liquid condensed in the interior of the heat exchanger arrangement can efficiently be fed hereby, independently from the installed position of the heat exchanger arrangement, e.g., by gravity to a liquid uptake area located lowest in the direction of gravity.

To make it possible to ensure an especially efficient collection of liquid, provisions may, furthermore, be made for at least one liquid uptake area to be provided each in the longitudinal direction on both sides of the waste gas discharge opening. It can consequently be ensured with such a design especially in the area of the waste gas discharge opening that condensed liquid is kept effectively away from the waste gas discharge area, so that this liquid cannot come into contact with a flame sensor provided in the area of the waste gas discharge opening.

The manufacture of the heat exchanger arrangement can be made especially simple if at least one liquid uptake area in the inner housing is designed as an uptake area that is open in the direction of the longitudinal axis. This variant offers the possibility to manufacture the inner housing as a cast part or to prepare at least one liquid uptake area later, for example, by milling.

The present invention pertains, in another aspect, to a vehicle heater comprising a heat exchanger arrangement according to the present invention.

The present invention will be explained in more detail below with reference to the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
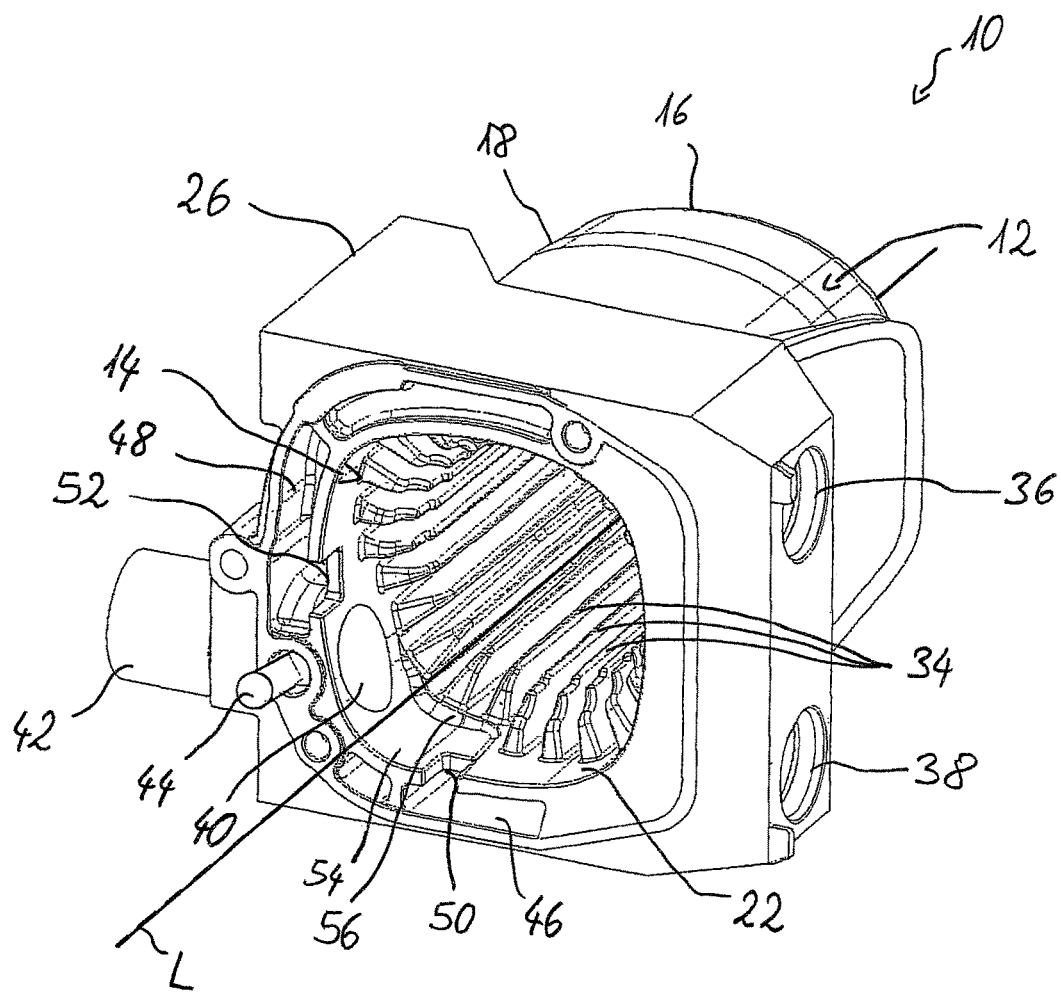
FIG. 1 is a perspective view of a heat exchanger arrangement according to the present invention.
Figure 2:
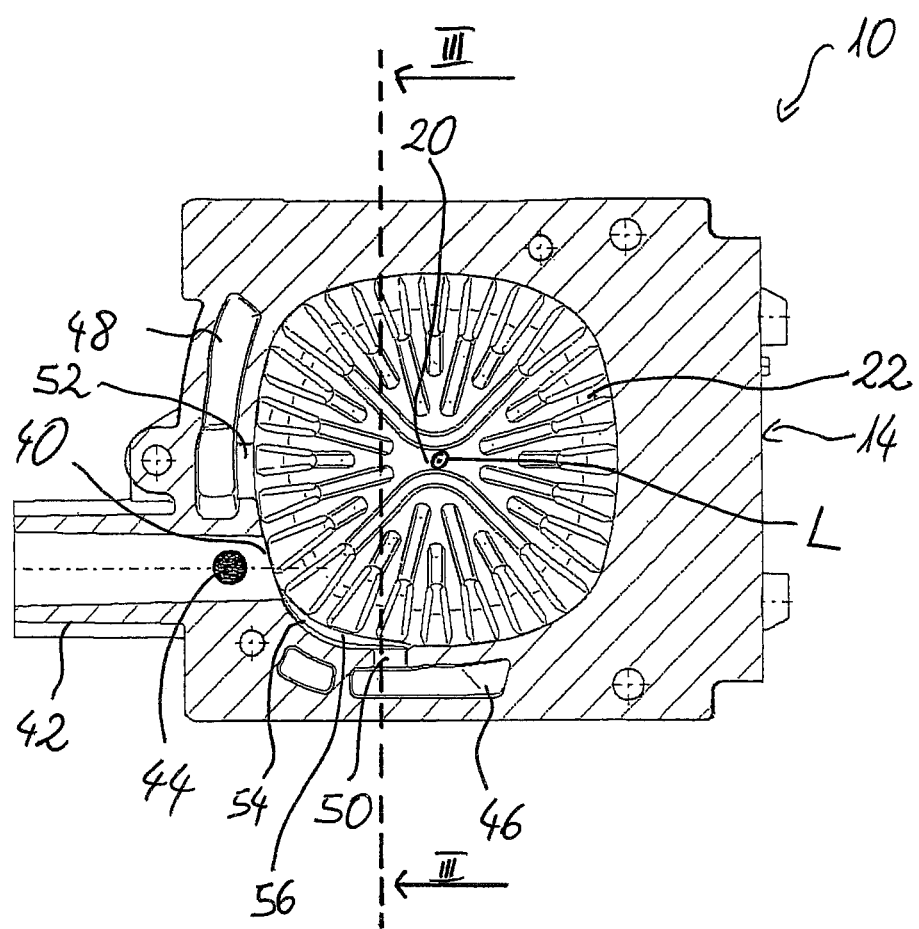
FIG. 2 is a cross-sectional view of the heat exchanger arrangement shown in FIG. 1.
Figure 3:
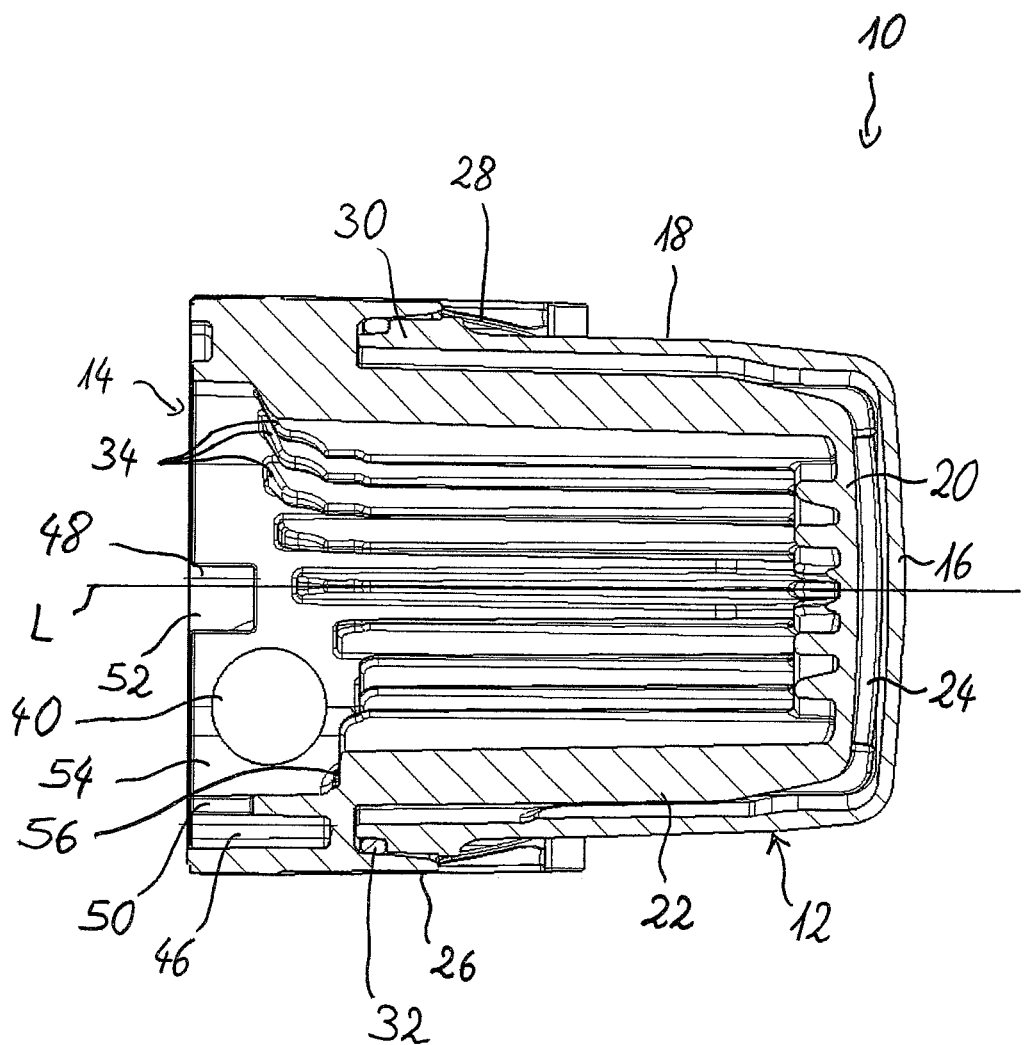
FIG. 3 is a longitudinal sectional view of the heat exchanger arrangement shown in FIGS. 1 and 2 according to line III shown in FIG. 2.

Referring to the drawings, FIGS. 1 through 3 show a heat exchanger arrangement very generally designated by reference number 10. This comprises an outer pot shaped housing 12 and an inner pot shaped housing 14. The outer housing 12 has an outer bottom wall 16 and an outer circumferential wall 18. The inner housing 14 has an inner bottom wall 20 and an inner circumferential wall 22. The outer circumferential wall 18 and the inner circumferential wall 22 extend each essentially along a longitudinal axis L of the heat exchanger arrangement 10. A flow space 24 for fluid whose temperature is to be regulated is defined between the outer housing 12 and the inner housing 14.

As is shown in FIG. 3, the inner housing 14 has a collar section 26, which defines, together with the inner circumferential wall 22, a mounting space 28 for an axial end area 30 of the outer housing 12, which mounting space is located at a distance from the outer bottom wall 16. As is shown, a sealing ring 32 may be additionally provided for sealing the flow space 24 between the axial end area 30 of the outer housing 12 and the collar section 26.

The inner housing 14 has a plurality of heat-conducting ribs 34, which extend both essentially along the longitudinal axis L and in the circumferential direction following one another on the inner circumferential wall 22 as well as on the inner bottom wall 20.

A combustion tube starting from a combustion chamber of a fuel-operated heater protrudes during the operation into the heat exchanger arrangement 10, so that an open end area of the combustion tube is located essentially opposite the inner bottom wall 20. Waste gases flowing out of the combustion tube via the open end area therefore reach first the inner bottom wall 20, are deflected at this and then flow essentially in the direction of the longitudinal axis L away from the inner bottom wall 20 along the inner circumferential wall 22. Thermal energy is transferred in this case to the inner circumferential wall 22 and therefore also to the fluid flowing in the flow space 24, and an especially effective energy transfer is made possible by the heat-conducting ribs 34. The fluid to be heated is fed via an inlet opening 36 shown in FIG. 1 into the flow space 24 and is removed from this via a discharge opening 38. It may subsequently be fed, for example, to another heat exchanger arrangement, in which it can transfer part of its thermal energy to air that is to be introduced into the interior space of a vehicle for heating said interior space.

A waste gas discharge opening 40, which adjoins, as is shown in FIG. 2, a waste gas discharge pipe 42, is provided in an end area of the heat exchanger arrangement 10 in the direction of the longitudinal axis L, which end area is located at a distance from the inner bottom wall 20. A flame sensor 44 is provided in the area of the waste gas discharge opening 40. This sensor may be configured, for example, as a photodiode or as a conductivity sensor and is set up to record a flame-out. If a flame-out is recorded, reignition of the fuel/air mixture present in the combustion chamber is initiated by a control device, which is not shown here.

Substances being transported in the waste gases in the form of vapor, such as water, may condense in the heat exchanger arrangement 10 especially when the operation of the vehicle heater in which the heat exchanger arrangement 10 is in a cold state is started. The condensed liquid may collect in this case in the area of the waste gas discharge opening 40 and be whirled up by waste gases flowing subsequently, so that it may come into contact with the flame sensor 44. The operating characteristics of the latter may be affected hereby in such a way that it will incorrectly signal a flame-out, whereupon the control device needlessly initiates a restart of the vehicle heater.

To make it possible to avoid such a situation, a plurality of liquid uptake areas 46, 48 are provided in the heat exchanger arrangement 10 shown in the figures following each other in the circumferential direction, on both sides of the waste gas discharge opening 40. These can take up liquid condensed in the area of the flame sensor 44 and thereby efficiently prevent them from being whirled up by waste gas flowing off and from coming into contact with the flame sensor 44. Due to the arrangement being selected here for the liquid uptake areas 46, 48 in the circumferential direction on both sides of the waste gas discharge opening 40, the liquid condensed in the heat exchanger arrangement 10 can be taken up in one of the two liquid uptake areas 46, 48 being shown here independently from the installed position of the heat exchanger arrangement 10.

The liquid uptake areas 46 and 48 are designed as uptake areas that are open in the direction of the longitudinal axis L in the inner housing 12. This offers the possibility of manufacturing the inner housing 12 as a cast part or of preparing at least one liquid uptake area 46, 48 later, especially by milling. The ends open in the direction of the longitudinal axis L are covered during the operation, for example, by a cover plate.

As is shown in the Figures, the liquid uptake areas 46 and 48 are in connection with an inner space enclosed by the inner housing 14 via a respective opening 50, 52. As a result, the condensed liquid taken up in the liquid uptake areas 46 and 48 during the start phase of the vehicle heater can be released later, when the temperature of the inner housing 14 is sufficiently high, into the inner space enclosed by the inner housing 14 by evaporation and thus discharged together with the waste gases flowing off from the heat exchanger arrangement 10 via the waste gas discharge opening 40, without additional draining means being needed at the liquid uptake areas 46 and 48 for draining off the condensed water.

The extension of the openings 50, 52 in the direction of the longitudinal axis L and in the circumferential direction is smaller in the embodiment shown in the figures than the extension in the direction of the longitudinal axis L and in the circumferential direction of the respective liquid uptake areas 46, 48. It can be ensured hereby that a large part of the respective liquid uptake areas 46, 48 is covered by the inner housing 14. As a result, the actual interaction surface between waste gases flowing past and condensed liquid collected in a liquid uptake area 46, 48 becomes very small, so that condensed liquid is unlikely to be whirled up and thereby come into contact with the flame sensor 44.

To make it possible to collect condensed liquid especially effectively, a liquid guide channel 54, which is provided between the waste gas discharge opening 40 and the liquid uptake area 46, is associated with the liquid uptake area 46. This guide channel 54 is set off from the surrounding area of the inner housing 14 by a shoulder 56 in the embodiment being shown here. Liquid condensed especially in the area of the waste gas discharge opening 40 can be sent especially effectively to the liquid uptake area 46 by means of this liquid guide channel 54. Unlike in the embodiment being described here, such a liquid guide channel may, in principle, also be associated with each liquid uptake area.

While specific embodiments of the invention have been shown and described in detail to illustrate the application of the principles of the invention, it will be understood that the invention may be embodied otherwise without departing from such principles.

What is claimed is:

1. A heat exchanger arrangement for a fuel-operated vehicle heater, the heat exchanger comprising:
    an outer housing having an outer bottom wall and an outer circumferential wall extending along a longitudinal axis for providing a pot shaped structure of the outer housing;
    an inner housing having an inner bottom wall and an inner circumferential wall extending along the longitudinal axis for providing a pot shaped structure of the inner housing, wherein a flow space is formed, for a fluid for which a temperature is to be regulated, between the inner housing and the outer housing; and
    at least one liquid uptake area for taking up liquid condensed in the inner housing the at least one liquid uptake area being formed at the inner housing, the at least one liquid uptake area being in fluid connection with an inner space enclosed by the inner housing via an opening in the inner housing, the opening having a smaller extension in the circumferential direction and in the direction of the longitudinal axis than an extension of the at least one liquid uptake area in the circumferential direction and in the direction of the longitudinal axis, wherein one of at least one liquid guide channel is provided between a waste gas discharge opening, one of the at least one liquid uptake area and a step shoulder, the one of the at least one liquid guide channel is provided for guiding condensed liquid towards the one of the at least one liquid uptake area.

2. The heat exchanger arrangement in accordance with claim 1, wherein:
    the one of the at least one liquid uptake area is provided in a region of the waste gas discharge opening;
    the waste gas discharge opening is provided in an end area of the inner housing, which said end area is located at a distance from the inner bottom wall in a direction of the longitudinal axis.

3. The heat exchanger arrangement in accordance with claim 2, wherein the one of the at least one liquid guide channel leads from the waste gas discharge opening to the one of the at least one liquid uptake area.

4. The heat exchanger arrangement in accordance with claim 1, further comprising another liquid uptake area to provide at least two liquid uptake areas arranged one after another in the circumferential direction.

5. The heat exchanger arrangement in accordance with claim 1, further comprising:
    at least an additional liquid uptake area to provide a plurality of liquid uptake areas, wherein the waste gas discharge opening is in an end area of the inner housing, which said end area is located at a distance from the inner bottom wall in a direction of the longitudinal axis.

6. The heat exchanger arrangement in accordance with claim 1, wherein the inner housing comprises an inner housing circumferential surface comprising a first inner housing circumferential surface edge portion and a second inner housing circumferential surface edge portion, the inner housing circumferential surface defining at least a portion of the inner space of the inner housing, the first inner housing circumferential surface edge portion being located at a spaced location from the second inner housing circumferential surface edge portion, the opening being defined by at least the first inner housing circumferential surface edge portion and the second inner housing circumferential surface edge portion, wherein the inner space is in fluid communication with an interior space of the inner housing via the opening.

7. The heat exchanger arrangement in accordance with claim 6, wherein the interior space is defined by at least an inner housing surface of the inner housing, the inner housing surface being located at a greater radial distance than the inner housing circumferential surface with respect to the longitudinal axis.

8. A vehicle heater, comprising a heat exchanger arrangement, the heat exchanger arrangement comprising:
    an outer housing having an outer bottom wall and an outer circumferential wall extending along a longitudinal axis for providing a pot shaped structure of the outer housing;
    an inner housing having an inner bottom wall and an inner circumferential wall extending along the longitudinal axis for providing a pot shaped structure of the inner housing, wherein a flow space is formed, for a fluid for which a temperature is to be regulated, between the inner housing and the outer housing; and
    at least one liquid uptake area for taking up liquid condensed in the inner housing, the at least one liquid uptake area being formed at the inner housing, the at least one liquid uptake area being in fluid connection with an inner space enclosed by the inner housing via an opening in the inner housing, the opening having a smaller extension in the circumferential direction and in the direction of the longitudinal axis than an extension of the at least one liquid uptake area in the circumferential direction and in the direction of the longitudinal axis, wherein one of at least one liquid guide channel is provided between a waste gas discharge opening, one of the at least one liquid uptake area and a step shoulder, the one of the at least one liquid guide channel is provided for guiding condensed liquid towards the one of the at least one liquid uptake area.

9. The vehicle heater in accordance with claim 8, wherein:
    the one of the at least one liquid uptake area is provided in a region of the waste gas discharge opening;
    the waste gas discharge opening is provided in an end area of the inner housing, which said end area is located at a distance from the inner bottom wall in a direction of the longitudinal axis, wherein the one of the at least one liquid guide channel leads from the waste gas discharge opening to the one of the at least one liquid uptake area.

10. The vehicle heater in accordance with claim 8, further comprising:
    at least an additional liquid uptake area to provide a plurality of liquid uptake areas, wherein the waste gas discharge opening is in an end area of the inner housing, which said end area is located at a distance from the inner bottom wall in a direction of the longitudinal axis.

11. The vehicle heater in accordance with claim 8, wherein the inner housing comprises an inner housing circumferential surface comprising a first inner housing circumferential surface edge portion and a second inner housing circumferential surface edge portion, the inner housing circumferential surface defining at least a portion of the inner space of the inner housing, the first inner housing circumferential surface edge portion being located at a spaced location from the second inner housing circumferential surface edge portion, the opening being defined by at least the first inner housing circumferential surface edge portion and the second inner housing circumferential surface edge portion, wherein the inner space is in fluid communication with an interior space of the inner housing via the opening.

12. The vehicle heater in accordance with claim 11, wherein the interior space is defined by at least an inner housing surface of the inner housing, the inner housing surface being located at a greater radial distance than the inner housing circumferential surface with respect to the longitudinal axis.

13. A heat exchanger arrangement comprising:
    an outer housing having an outer bottom wall and an outer circumferential wall extending along a longitudinal axis;
    an inner housing having an inner bottom wall and an inner circumferential wall extending along the longitudinal axis, wherein a flow space is formed, for a fluid for which a temperature is to be regulated, between the inner housing and the outer housing, the inner housing having an inner circumferential wall defining a space to be exposed to combustion gas; and
    a liquid uptake volume for taking up liquid condensed in the inner housing, the liquid uptake volume being in fluid communication, through an opening in the inner housing, with the space to be exposed to combustion gas, the liquid uptake volume being defined by at least one of the inner housing and the outer housing, the opening having a smaller extension in the circumferential direction and in the direction of the longitudinal axis than an extension of the liquid uptake volume in the circumferential direction and in the direction of the longitudinal axis, wherein a liquid guide channel is provided between a waste gas discharge opening, the liquid uptake volume and a step shoulder, wherein the liquid guide channel is provided for guiding condensed liquid towards the liquid uptake volume.

14. The heat exchanger arrangement in accordance with claim 13, wherein:
    the liquid uptake volume is provided in a region of the waste gas discharge opening;
    the waste gas discharge opening is provided in an end area of the inner housing, which said end area is located at a distance from the inner bottom wall in a direction of the longitudinal axis.

15. The heat exchanger arrangement in accordance with claim 13, wherein the inner housing comprises a housing circumferential surface comprising a first housing circumferential surface edge portion and a second housing circumferential surface edge portion, the housing circumferential surface defining at least a portion of space of the inner housing, the first housing circumferential surface edge portion being located at a spaced location from the second housing circumferential surface edge portion, the opening being defined by at least the first housing circumferential surface edge portion and the second housing circumferential surface edge portion, wherein the inner space is in fluid communication with an interior space of the inner housing via the opening.

16. The heat exchanger arrangement in accordance with claim 15, wherein the interior space is defined by at least another housing surface of the inner housing, the another housing surface being located at a greater radial distance than the housing circumferential surface with respect to the longitudinal axis.

* * * * *